United States Patent
Kudelko

[15] 3,656,397
[45] Apr. 18, 1972

[54] BOLT HEAD CONFIGURATION
[72] Inventor: Arthur G. Kudelko, Glenside, Pa.
[73] Assignee: Standard Pressed Steel Co., Jenkintown, Pa.
[22] Filed: Nov. 28, 1969
[21] Appl. No.: 880,612

[52] U.S. Cl. ................................................85/9, 85/45
[51] Int. Cl. ..............................F16b 23/00, F16b 35/00
[58] Field of Search ....................85/9, 45, 61, 32; 287/119

[56] References Cited
UNITED STATES PATENTS
662,134  11/1900  Rodd ........................................85/45

Primary Examiner—Ramon S. Britts
Attorney—Andrew L. Ney

[57] ABSTRACT

A bolt comprising a threaded shank portion and a head member having an optimum strength to weight configuration. The head member comprises a planar base section projecting radially outwardly from the shank portion and an inclined shoulder extending upwardly from the planar base section and inwardly toward the outer periphery of an upward extension of the shank portion. A wrenching configuration is formed on the head and extends downwardly from a plane defined by the intersection of the inclined shoulder, if extended, and an extension of the outer periphery of the shank portion.

11 Claims, 6 Drawing Figures

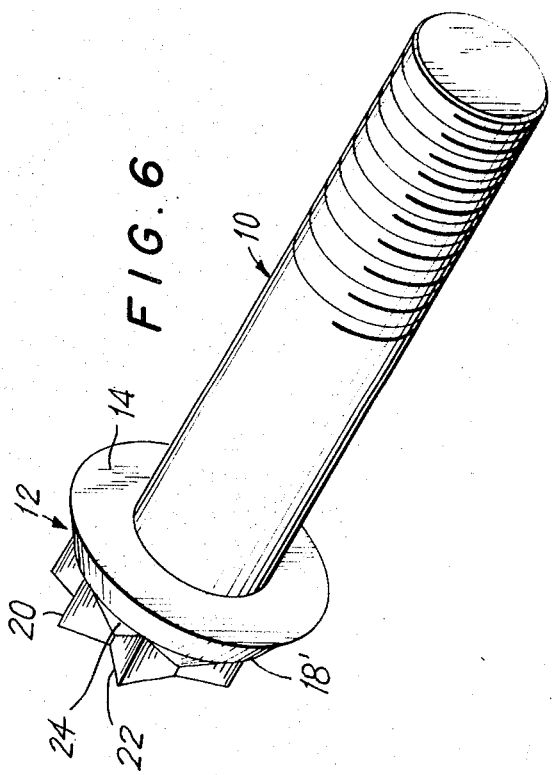
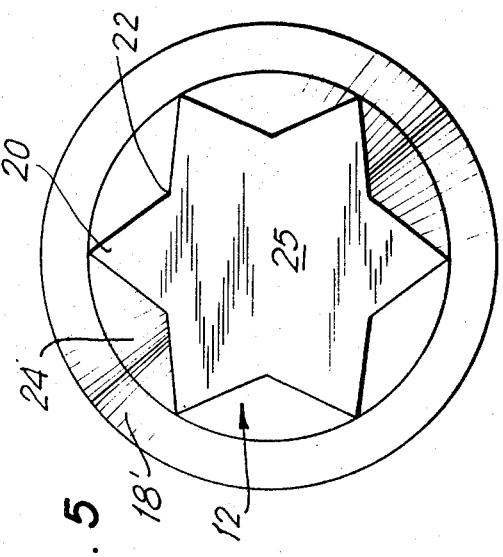
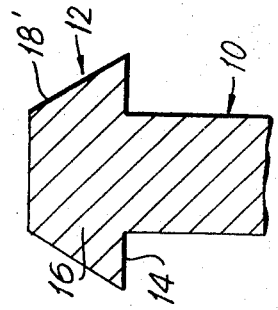
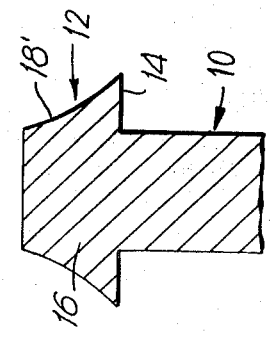
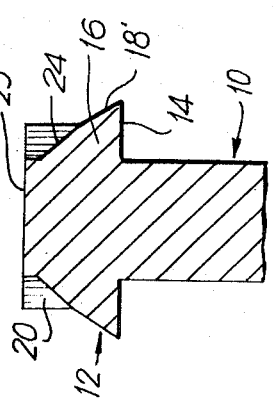
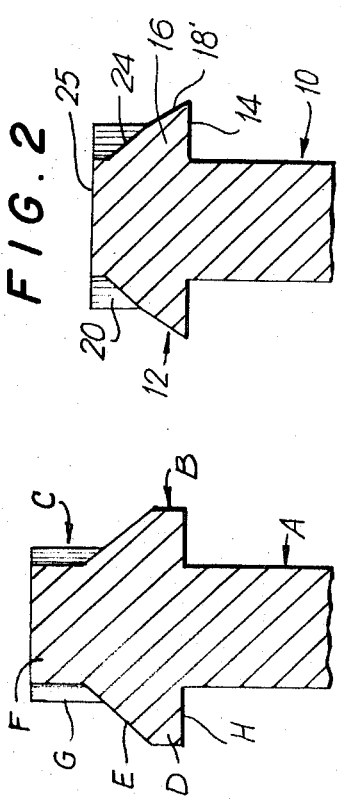

BOLT HEAD CONFIGURATION

Strength and weight considerations, especially in the aerospace field, are receiving more and more attention in the structural design of various devices. While it is desirable to reduce the weight of a structure to a minimum, it is of paramount importance that the strength of the structure be retained at a maximum. These factors are of extreme importance in the design of structural joints where failure is most likely to occur. In the aerospace field, particularly, failure of a joint cannot be tolerated and relatively heavy, high strength fasteners are utilized. Since a relatively large number of these fasteners are used in aerospace devices, considerable weight is added to the device.

One type of high strength fastener often used is a bolt or similar type headed male element. As the bolt is assembled with its mating piece, the head is subjected to a tensile load which it must resist to prevent failure of the joint. The load resisting or functional portion of the usual head includes a base section of finite thickness along the axis of the bolt projecting radially from the shank of the bolt and an inclined shoulder portion extending upwardly from the outer edge of the base section to the outer periphery of an upward extension of the shank. To allow torquing of the bolt, a drive or wrenching configuration is provided and is usually in the form of an appendage to the functional portion of the head, that is, it extends upwardly from the intersection of the inclined shoulder portion and the outer periphery of the upward extension of the shank and provides no resistance to tensile loads on the head. While the head configuration just described provides the strength required to resist tensile loads imposed when the bolt is tightened, it is relatively heavy.

It is an object of this invention, therefore, to provide a bolt having a light weight head configuration that will not fail under the tensile loads imposed when the bolt is tightened.

It is another object of this invention to provide a bolt having a head configuration including a wrenching configuration integrated with the head configuration so as to be a functional part thereof in resisting tensile loads imposed by the tightening of the bolt.

These and other objects are accomplished by providing a bolt having a shank portion and an integral head portion including a planar base section. Projecting upwardly at an angle from the planar base section is an inclined shoulder section the outer surface of which, if extended, intersects the outer periphery of an upward extension of the shank portion. Integrated with the shoulder section to resist tensile loads imposed by assembling the bolt with the mating piece is a wrenching configuration that extends downwardly from the plane defined by the intersection of the shoulder section and the outer periphery of the upward extension of the shank portion.

For a better understanding of the invention, reference may be made to the following description of a preferred embodiment, taken in conjunction with the figures of the accompanying drawings in which:

FIG. 1 is a sectional view of a portion of a typical prior art bolt taken along the longitudinal axis thereof;

FIG. 2 is a sectional view of a portion of a bolt in accordance with this invention taken along the longitudinal axis of the bolt and showing the bolt head with a typical wrenching configuration integrated therewith;

FIG. 3 is a sectional view similar to FIG. 2 showing the bolt head configuration without a wrenching surface;

FIG. 4 is a view similar to FIG. 3 showing another form of the bolt head configuration without a wrenching surface;

FIG. 5 is a top plan view of the bolt shown in FIG. 2; and

FIG. 6 is a perspective view of the bolt shown in FIG. 2.

For a better understanding of the principles involved in the invention described herein, reference is made to FIG. 1 wherein a typical prior art bolt is shown as comprising a shank portion A having threads thereon (not shown) and a head configuration B having a wrenching configuration C. Head configuration B comprises a base section D having a finite thickness when measured along the longitudinal axis of shank section A, and a shoulder section E inclined upwardly from the outer edge of the base section and extending to a point where it intersects the outer periphery of an upward extension of the shank portion. Mounted on top of head configuration B is the wrenching configuration C which includes an upwardly extending central portion F about which is formed a plurality of ribs G adapted to be engaged by a suitable driving tool for torquing the bolt in assembling or disassembling it with a mating piece.

When headed bolts of this type are being assembled with a mating piece, the bottom section H of base section B bears against the joint and is subjected to a tensile load which is taken up entirely by head configuration B. Accordingly, wrenching configuration C is merely an appendage to the bolt head and adds additional weight to the bolt. As will be explained hereinafter, the thickness of base section D merely adds superfluous weight to the bolt since it is not required to resist the tensile load acting on bottom section H.

According to one aspect of this invention, the weight of a bolt is significantly reduced while its strength is retained due to the configuration of the load resisting part of the head. Referring first to FIGS. 3 and 4, a bolt in accordance with this aspect of the invention is shown and comprises a shank portion 10 including threads (not shown) and a head 12 including a planar base section 14 projecting radially outwardly from the shank portion. By planar is meant that the base section has no thickness and lies in a plane. When the bolt is being assembled with a mating piece, base section 14 bears against the outer surface of the joint and is subjected to a uniform tensile loading which must be resisted to prevent cracking of the head. From an analysis of the tensile load, it has been determined that the outer periphery of the base section is not subjected to any shear forces or moment and that shear and moment increase with distance from the outer periphery of the base section to the shank of the bolt. If plotted, the shear diagram is a first degree curve increasing as the shank of the bolt is approached. Similarly, the moment diagram, although a second degree curve, also increases as the shank of the bolt is approached. The head configuration, as shown in FIG. 3, includes an upwardly and inwardly inclined shoulder section 16 having an arcuate outer surface 18 extending to the outer periphery of an extension of shank portion 10. The inclination of outer surface 18 follows the shear and/or moment diagram, depending in their relative significance, so that at every point therealong, there is enough strength to resist the loads imposed by the tightening of the bolt with the mating piece. It should be noted that although shoulder section 16 is shown as concave, it could also be convex depending on the design parameters of the bolt and the joint.

Referring to FIG. 4, according to another embodiment of this aspect of the invention, arcuate surface 18 of shoulder 16 can be replaced with a straight-line segment 18' that provides the same advantages as the arcuate surface and facilitates manufacture of the bolt. Of course, it is necessary to form surface 18' slightly to the outside of arcuate surface 18 in order to provide the required resistance to the tensile load. Accordingly, a slight amount of weight is added to the bolt head, but this additional weight is negligible and not detrimental for most applications of the bolt.

According to another aspect of this invention, a wrenching configuration is integrated with the head as a load-resisting part and is shown in FIGS. 2, 5 and 6 with the head configuration shown in FIG. 4 and using like reference numerals. The wrenching configuration comprises a plurality of ribs 20 spaced apart by flutes 22. The ribs and flutes are preferably, although not necessarily, formed around the outer periphery of the upward extension of shank portion 10 or an imaginary cylinder concentric therewith. At this point, it should be noted that in the area of flutes 22, surface 18' of shoulder 16 does not extend as a straight line toward the outer periphery of the upward extension of shank 10. Instead a surface 24 is provided on the shoulder at a slight angle to surface 18' to accommodate a conventional driving tool. It is to be understood, of course, that surface 18' could extend as a straight line and that surface 24 need not be provided if the driving tool includes a taper complementary to surface 18'. If, however, surface 18' were extended upwardly as a straight line, it would intersect the outer periphery of the upward extension of shank 10 and define a plane containing the top end 25 of the bolt. Ribs 20 and flutes 22 extend downwardly from this plane and, thus, no portion of the wrenching configuration extends above the head. Accordingly, the wrenching configuration is integral with the head in that it functions to resist the tensile loads imposed on the head when the bolt is tightened.

It should be noted that when this type of wrenching configuration is utilized, weight is added to the bolt head because of the material required to form the ribs. However, it should also be noted that weight is reduced because material is removed to form surface 24. The weight of the material added by the ribs slightly exceeds that of the material removed by surface 24, but this slight increase in the overall weight of the bolt is not detrimental for most applications.

It should also be understood that various other wrenching configurations can be utilized by suitable modification of the optimum configuration shown in FIGS. 3 and 4.

While in the foregoing there has been described a preferred embodiment of the invention, various modifications may become apparent to those skilled in the art to which this invention relates. Accordingly, all such modifications are included within the intended scope of this invention.

What is claimed is:

1. A fastener comprising a shank portion having a thread thereon and an enlarged head portion having wrenching means formed thereon, said head portion comprising a base projecting radially outwardly from said shank portion and an inclined shoulder extending upwardly and inwardly from said base, said wrenching means extending downwardly from and being entirely below a plane located at the intersection of the inclined shoulder if extended and the outer periphery of an extension of said shank portion.

2. A fastener according to claim 1 wherein the base is a planar surface.

3. A fastener according to claim 1 wherein the outer surface of said shoulder is arcuate.

4. A fastener according to claim 1 wherein the outer surface of said shoulder is straight.

5. A fastener according to claim 1 wherein said wrenching means comprises a plurality of ribs formed on the external surface of said head member, said ribs extending from said plane to said shoulder.

6. A fastener according to claim 5 wherein the inner surface of said ribs lie along said outer periphery of said extension of said shank.

7. A fastener comprising a shank portion having a thread thereon and an enlarged head portion having wrenching means formed thereon, said head portion comprising a planar base section and an inclined shoulder extending upwardly from said base, and said wrenching means extending downwardly from and being entirely below a plane located at the intersection of said inclined shoulder if extended and the outer periphery of an extension of said shank portion.

8. A fastener according to claim 7 wherein said wrenching means comprises a plurality of ribs formed on the external surface of said head member, said ribs extending from said plane to said shoulder.

9. A fastener according to claim 8 wherein the inner surface of said ribs lie along said outer periphery of said extension of said shank.

10. A fastener according to claim 7 wherein the outer surface of said shoulder is arcuate.

11. A fastener according to claim 7 wherein the outer surface of said shoulder is straight.

* * * * *